United States Patent
Henttonen et al.

(10) Patent No.: US 11,252,575 B2
(45) Date of Patent: Feb. 15, 2022

(54) INTER-RAT CONFIGURATION COORDINATION

(71) Applicant: Nokia Technologies Oy, Espoo (FI)

(72) Inventors: Tero Henttonen, Espoo (FI); Amaanat Ali, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/343,180

(22) PCT Filed: Oct. 20, 2017

(86) PCT No.: PCT/FI2017/050731
§ 371 (c)(1),
(2) Date: Apr. 18, 2019

(87) PCT Pub. No.: WO2018/083374
PCT Pub. Date: May 11, 2018

(65) Prior Publication Data
US 2019/0246286 A1  Aug. 8, 2019

Related U.S. Application Data

(60) Provisional application No. 62/417,630, filed on Nov. 4, 2016.

(51) Int. Cl.
*H04W 16/14* (2009.01)
*H04W 8/22* (2009.01)
(Continued)

(52) U.S. Cl.
CPC ............ *H04W 16/14* (2013.01); *H04L 5/001* (2013.01); *H04W 8/22* (2013.01); *H04W 72/04* (2013.01); *H04L 5/0098* (2013.01); *H04W 88/06* (2013.01)

(58) Field of Classification Search
CPC ....... H04W 16/14; H04W 8/22; H04W 72/04; H04W 88/06; H04L 5/001; H04L 5/0098
See application file for complete search history.

(56) References Cited

U.S. PATENT DOCUMENTS

| | | | |
|---|---|---|---|
| 2015/0003381 A1* | 1/2015 | Dinan | H04W 36/06 370/329 |
| 2015/0230107 A1 | 8/2015 | Chiba et al. | H04W 24/04 |

(Continued)

FOREIGN PATENT DOCUMENTS

| | | |
|---|---|---|
| WO | 2015/047051 A1 | 4/2015 |
| WO | 2015/115959 A1 | 8/2015 |
| WO | 2016/133123 A1 | 8/2016 |

OTHER PUBLICATIONS

"Report of e-mail discussion [95#30] Capability Coordination for NR and LTE", 3GPP TSG-RAN WG2 Meeting #95bis, R2-16xxxx, Agenda: X.X, Qualcomm Incorporated, Oct. 10-14, 2016, pp. 1-15.

(Continued)

*Primary Examiner* — Wayne H Cai
(74) *Attorney, Agent, or Firm* — Harrington & Smith

(57) ABSTRACT

An apparatus and method comprising: determining by a first network node of a user equipment that a user equipment is to be dual connected to the first network node and a second network node; identify at least one radio configuration supported by the first network node from communication capability information of the user equipment; sending information to the second network node, the information comprising the capability information and the at least one radio configuration supported by the first network node; and in response to the sending, receiving from the second network node an indication of a chosen at least one radio configuration of the at least one supported radio configuration for use in the dual connection.

16 Claims, 7 Drawing Sheets

(51) Int. Cl.
*H04L 5/00* (2006.01)
*H04W 72/04* (2009.01)
*H04W 88/06* (2009.01)

(56) References Cited

U.S. PATENT DOCUMENTS

| | | | |
|---|---|---|---|
| 2016/0029362 A1 | 1/2016 | Kim et al. | |
| 2016/0057687 A1 | 2/2016 | Horn et al. | |
| 2017/0034866 A1* | 2/2017 | Wager | H04L 5/0091 |
| 2018/0359790 A1* | 12/2018 | Ingale | H04W 28/16 |
| 2019/0200269 A1* | 6/2019 | Shi | H04W 36/38 |
| 2020/0022203 A1* | 1/2020 | Fujishiro | H04W 92/20 |

OTHER PUBLICATIONS

International Search Report and Written Opinion received for corresponding Patent Cooperation Treaty Application No. PCT/FI2017/050731, dated Feb. 9, 2018, 16 pages.

"Report of e-mail discussion [95#30] Capability Coordination for NR and LTE", 3GPP TSG-RAN WG2 Meeting #95bis, R2-167065, Agenda: 9.2.2.3, Qualcomm Incorporated, Oct. 10-14, 2016, pp. 1-40.

"UE Capability and Radio Configuration Coordination for NRLTE Tight Interworking", 3GPP TSG-RAN2#95bis, R2-167109, Agenda: 9.2.2.3, NTT Docomo, Inc., Oct. 10-14, 2016, pp. 1-3.

Rosa et al., "Dual Connectivity for LTE Small Cell Evolution: Functionality and Performance Aspects", IEEE Communications Magazine, vol. 54, Issue 6, Jun. 2016, pp. 137-143.

"Report of email discussion [94#39][NR] C plane aspects for tight interworking", Intel Corporation (Rapporteur), 3GPP TSG-RAN WG2 Meeting #95, R2-165012, Aug. 2016, 38 pgs.

"UE capability coordination in case of IRAT DC", Samsung, 3GPP TSG-RAN WG2 Meeting #95, R2-165044, Aug. 2016, 6 pgs.

"On UE capability and network node coordination aspects in LTE-NR tight interworking", Nokia, et al., 3GPP TSG-RAN WG2 Meeting 395bis, R2-166243, Oct. 2016, 9 pgs.

"UE capability coordination in case of IRAT DC, further solution details", Samsung, 3GPP TSG-RAN WG2 Meeting #95 bis, R2166660, Oct. 2016, 6 pgs.

"General considerations for LTE-NR tight interworking", Nokia, Alcatel-Lucent Shanghai Bell, 3GPP TSG-RAN WG2 Meeting #95, R2-164752, Aug. 22-26, 2016, 11 pages.

"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300 V14.0.0, Sep. 2016, 314 pages.

* cited by examiner

```
UE-EUTRA-Capability-v15xy-IEs ::= SEQUENCE {
    rf-Parameters-v15xy           RF-Parameters-v15xy                 OPTIONAL,      ← 310
    nonCriticalExtension          SEQUENCE {}                         OPTIONAL
}
RF-Parameters-v15xy ::=           SEQUENCE {
    supportedBandListEUTRA-v15xy        SupportedBandListEUTRA-v15xy          OPTIONAL,
    supportedBandCombination-v15xy      SupportedBandCombination-v15xy        OPTIONAL,
    supportedBandCombinationAdd-v15xy   SupportedBandCombinationAdd-v15xy     OPTIONAL,
    supportedBandCombinationReduced-v15xy  SupportedBandCombinationReduced-v15xy  OPTIONAL
}                                                                                          ← 320
SupportedBandCombination-v15xy ::= SEQUENCE (SIZE (1..maxBandComb-r10)) OF
BandCombinationParameters-v15xy
SupportedBandCombinationAdd-v15xy ::= SEQUENCE (SIZE (1..maxBandComb-r11)) OF              ← 330
BandCombinationParameters-v15xy
SupportedBandCombinationReduced-v15xy ::=  SEQUENCE (SIZE (1..maxBandComb-r13)) OF
BandCombinationParameters-v15xy
SupportedBandCombinationReduced-v15xy ::=  SEQUENCE (SIZE (1..maxBandComb-r13)) OF
BandCombinationParameters-v15xy
SupportedBandListEUTRA- v15xy::= SEQUENCE (SIZE (1..maxBands)) OF SupportedBandEUTRA-v15xy
SupportedBandEUTRA-v15xy ::=     SEQUENCE {
    IteIndex-r15                        BandCombinationIndex-r15              OPTIONAL,
    supportedNR-Combinations-r15        SupportedNR-Combinations-r15          OPTIONAL
}                                                                                          ← 340
BandCombinationParameters-v15xy ::= SEQUENCE {
    IteIndex-r15                        BandCombinationIndex-r15              OPTIONAL,
    supportedNR-Combinations-r15        SupportedNR-Combinations-r15          OPTIONAL
}
BandCombinationParameters-v15xy ::= SEQUENCE {
    IteIndex-r15                        BandCombinationIndex-r15              OPTIONAL,
    supportedNR-Combinations-r15        SupportedNR-Combinations-r15          OPTIONAL
}
SupportedNR-Combinations-r15 ::= SEQUENCE (SIZE (1..maxInterworkingCombinations-r15) ) OF
BandCombinationIndex-r15
BandCombinationIndex-r15 ::= INTEGER (1..maxBandComb-r15)
```

FIG.3

INTER-RAT CONFIGURATION COORDINATION

RELATED APPLICATION

This application was originally filed as PCT Application No. PCT/FI2017/050731, filed on Oct. 20$^{th}$ 2017, which claims priority from U.S. Application No. 62/417,630, filed on Nov. 4$^{th}$ 2016.

TECHNICAL FIELD

The teachings in accordance with the example embodiments of this invention relate generally to coordinating long term evolution (LTE) and new radio (NR) configurations and, more specifically, relate to coordinating LTE and NR configurations without one system requiring to know details of the capabilities or configurations of the other system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP 3rd Generation Partnership Project
AS Access Stratum
ASN.1 Abstract Syntax Notation One
CA Carrier Aggregation
CoMP Coordinated Multi-Point
DC Dual Connectivity
DL Downlink
eNB evolved Node-B
gNB next-Generation Node-B
LTE Long Term Evolution
MeNB Master eNB
NAICS Network-Assisted Interference Cancellation and Suppression
NAS Non-Access Stratum
NR New Radio
RAN Radio Access Network
RAT Radio Access Technology
SeNB Secondary eNB
UE User Equipment
UL Uplink
VoLTE Voice over LTE
WCDMA Wideband Code Division Multiple Access LTE-NR tight interworking is envisioned to handle early deployment cases of (new radio) NR communications where LTE coverage already exists but NR cannot necessarily be yet operated in stand-alone mode. One proposed solution is to allow a "dual connectivity" between LTE and NR eNBs wherein UE is operating via LTE as MeNB and NR is operating as a non-standalone "SeNB". However, since the UE is involved with both NR and LTE radio access technologies (RATs), this requires some coordination of radio configurations to ensure user equipment (UE) capabilities are not exceeded. Further, it would be desirable to have the LTE and NR systems operate as independently as possible so as not to enforce too much software/hardware compatibilities between the eNBs or within UE implementation of the LTE and NR modems, and thus limiting their usage.

The example embodiment of the invention as described below work to address at least the issues as mentioned above.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 3 shows a Table with examples of ASN.1 code for capturing the configuration linkage information in LTE UE capabilities;

DETAILED DESCRIPTION

Figure 1:
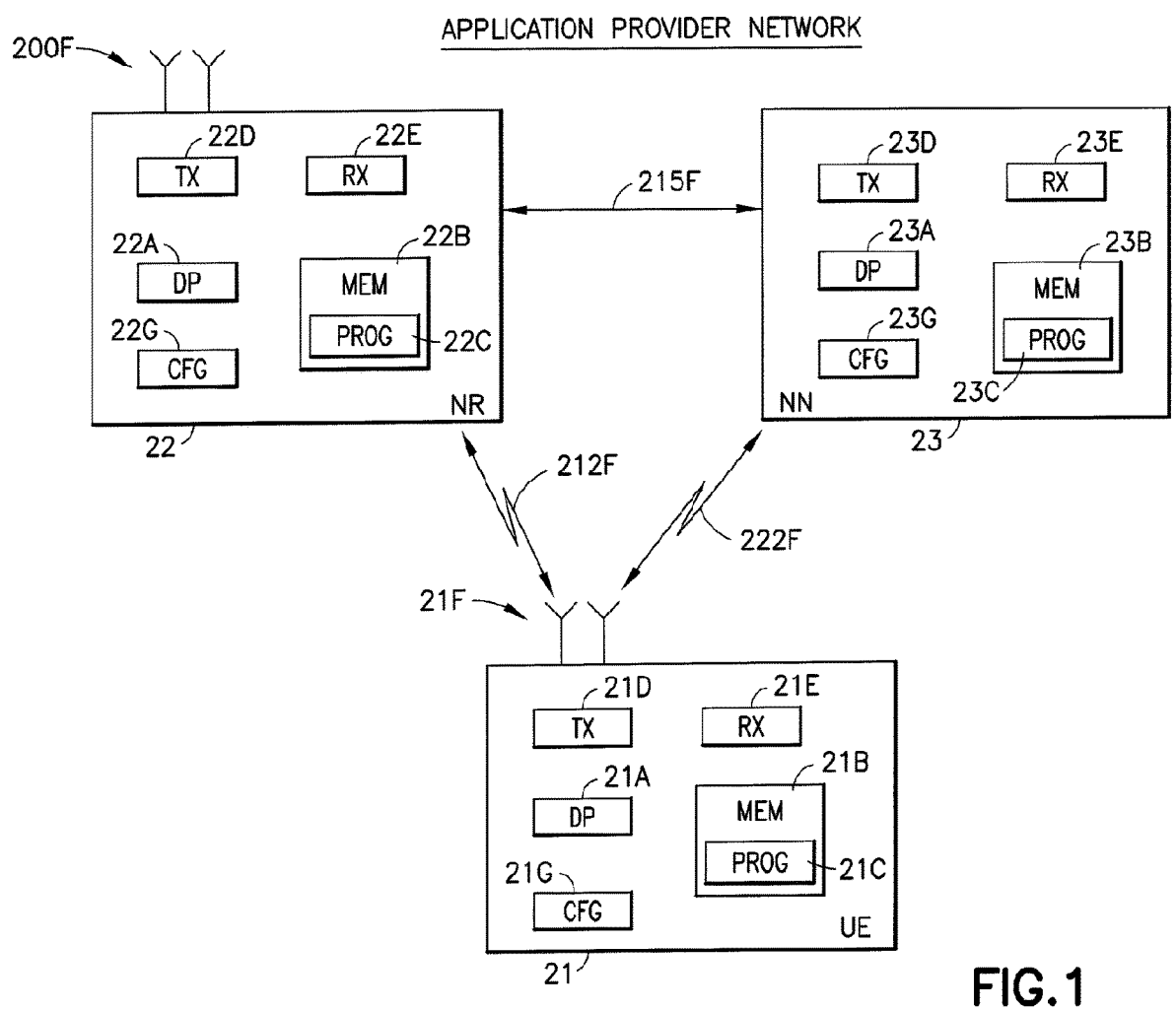
FIG. 1 shows a simplified block diagram of various electronic devices that are suitable for use in practicing the example embodiments of this invention.

In accordance with the example embodiments of the invention there is proposed at least a method and apparatus to perform coordinating LTE and NR configurations without one system requiring to know the details of the capabilities or configurations of the other system.

It is noted that a UE capable of e.g. 5DL CA in LTE may be more limited in its CA capabilities while operating under LTE-NR configuration, potentially only being able to do e.g. 3DL CA. Further, it is noted that since the UE capabilities often depend on for example the exact band combinations or receive operations (e.g., CoMP, NAICS, MIMO layers), it may not be possible to have a generic rule that would allow simple coordination between UE LTE and NR configurations.

In many communication protocols, parties participating in the communication exchange the information about its capability so that the each party does not request any capability which is not supported by its counterpart. In mobile communication (e.g., LTE, WCDMA), Network informs the required access parameters that depend on its capabilities via various SIB messages and UE informs its capabilities via various AS (=RRC) or NAS messages. In WCDMA, UE informs on its capability as a part of RRC Connection Complete message and in LTE they defined a separate message designed for this kind of capability information report. The procedure includes that whenever a network wants to know UE capability (which in some cases can be during registration to the network), the network sends a 'UE Capability Enquiry' message to specify which information it wants to get (i.e., which RAT capabilities to indicate, each of which is a different type of capability item and the network can specify any one or multiple items in UE Capability Enquiry message). Then UE has to report all the capability information requested by Network.

It should also be noted that while the primary use case envisioned for LTE-NR operation is early NR deployments, the same operation, just with NR as master node could be envisioned for later deployments such as where an existing LTE eNB is used to provide for example services that are more reliable at LTE side (e.g. VoLTE) or used simply to boost the reliability of NR transmissions, such as when NR is operating at high frequency bands. Finally, as per recent 3GPP agreements the capabilities of each system should be independent even though they may contain information about measurement capabilities of the other RAT. It has been decided in 3GPP RAN WG2 (=RAN2) meeting #95 that:

1. From a RAN2 perspective, we aim to have an independent capability information for NR and LTE (meaning that node of one RAT does not need to look at the capabilities of the other RAT). Does not preclude that capabilities of one RAT might contain some information related to the other RAT (e.g. at least measurement capabilities); and 2. RAN2 should study further how to coordinate capabilities between the UE, LTE eNB and NR (next-generation node B) gNB.

It is noted that a basic problem can be stated as how to coordinate LTE and NR configurations in tight interworking so that neither system is required to read or (fully) comprehend the other's configuration or capabilities.

The example embodiments of the invention provide at least a method where an apparatus with which both LTE and NR can coordinate their configurations without requiring to explicitly know the details of their respective capabilities or configurations.

Before describing in further detail the example embodiments of this invention reference is made to FIG. 1 for illustrating a simplified block diagram of various electronic devices and apparatus that are suitable for use in practicing the example embodiments of this invention.

The new radio (NR 22) of FIG. 1 can be associated with a public or private cloud of a communication network. The NR 22 can be incorporated in any kind of communication device such as a base station (eNB), a remote apparatus, or a server. The NR 22 includes a controller, such as at least one computer or a data processor (DP) 22A, at least one computer-readable memory medium embodied as a memory (MEM) 22B that stores a program of computer instructions (PROG) 22C, and at least one suitable RF transceiver 22D for communication with the UE 21 via antennas 21F (several when MIMO operation is in use). The NR 22 is coupled via a data/control path 212F to the UE 21. The path 212F may be implemented such as by a wired and/or wireless connection. The NR 22 can also be coupled to another device, such as via the data/control path 215F to the NN 23.

The network node (NN 23) of FIG. 1 can also be associated with a public or private cloud of a communication network. This cloud may be the same Cloud as the cloud the NR 22 is in, or may be a different public or private cloud. The NN 23 can be incorporated in any kind of communication device such as a base station (eNB), a remote apparatus, or a server. The NN 23 includes a controller, such as at least one computer or a data processor (DP) 23A, at least one computer-readable memory medium embodied as a memory (MEM) 23B that stores a program of computer instructions (PROG) 23C, and at least one suitable RF transceiver 23D for communication with the UE 21 via antennas 21F (several when MIMO operation is in use). The NN 23 is coupled via a data/control path 222F to the UE 21. The path 222F may be implemented such as by a wired and/or wireless connection. The NN 23 can also be coupled to other devices, such as the NR 22 via the data/control path 215F to the NR 22.

The user equipment (UE) 21 includes a controller, such as at least one computer or a data processor (DP) 21A, at least one non-transitory computer-readable memory medium embodied as a memory (MEM) 21B that stores a program of computer instructions (PROG) 21C, and at least one suitable radio frequency (RF) transmitter and receiver pair (transceiver) 21D for bidirectional wireless communications with the key management system 23, the application server 22, and/or another device associated with the cloud via an antenna or antennas 21F, and/or a hardwired connection. In addition the NN 23 may be directly or indirectly connected to the UE 21 such as via a connection 222F. In addition, the UE 21 may also be connected with the NR 22 such as via a connection 212F. Further, the UE 21 can also be associated with a public or private cloud such as its own cloud or a cloud of the NR 22 and/or NN 23.

For the purposes of describing the example embodiments of this invention the NR 22, the UE 21, and/or the NN 23 may be assumed to include a configuration module (CFG). The CFG 21G, CFG 22G, and/or the CFG 23G are assumed to be configured to operate to perform the LTE/NR/4G/5G configuration determining and/or selecting in accordance with the non-limiting examples of the embodiments of this invention as described herein.

At least one of the programs PROG 21C, 22C, and 23C is assumed to include program instructions that, when executed by the associated data processor, enable the device to operate in accordance with the example embodiments of this invention, as will be discussed below in greater detail. That is, the example embodiments of this invention may be implemented at least in part by computer software executable by the DP 21A, DP 22A, and/or DP 23A, or by hardware, or by a combination of software and hardware (and/or firmware). Likewise, the configuration (CFG) modules CFG 21G, CFG 22G, and the CFG 23G may be implemented at least in part by executable computer software, or by hardware, or by a combination of software and hardware (and firmware).

The various data processors, memories, programs, transceivers and interfaces depicted in FIG. 1 may all be considered to represent various means for performing operations and functions that implement the several non-limiting aspects and embodiments of this invention.

In general, the various embodiments of the UE 21 may include, but are not limited to, a server, cellular mobile devices, personal digital assistants (PDAs) having wireless and/or wired communication capabilities, portable computers having communication capabilities, GPS devices, image capture devices such as digital cameras having communication capabilities, gaming devices having communication capabilities, music storage and playback appliances having communication capabilities, Internet appliances permitting wireless Internet access and browsing, as well as portable units or terminals that incorporate combinations of such functions.

The computer-readable memories 21B, 22B, and 23B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 21A, 22A, and 23A may be of any type suitable to the local technical environment, and may include one or more of general purpose computers, special purpose computers, microprocessors, digital signal processors (DSPs) and processors based on multi-core processor architectures, as non-limiting examples.

The invention, relates to 4G, 5G, and/or other communication network technologies and looks in particular at LTE- New Radio interworking. Further, it is noted that the reference to LTE and NR herein is non-limiting. These radio technology references can relate to any suitable upcoming or pending radio access technology.

The invention looks at the situation where both an LTE (or other RAT) and New Radio networks are present and work in a dual connectivity mode (tight interworking) whereby UEs use a Master-eNB that is part of the LTE network and a Secondary-eNB that is part of the New Radio network. In such a case, it has been agreed in 3GPP RAN2, that each RAT (e.g., devices in the LTE and New Radio network) do not need to look at the configuration of the other.

The invention proposes a mechanism that will allow a RAT to be able to select an appropriate configuration that suits the UE capabilities. The core point of the proposal, is that in order to coordinate between them, the Master-eNB will indicate to the Secondary-eNB, its chosen configuration, based on the UE capabilities. The Secondary-eNB, in turn will use this indication to identify the configurations that it can use (again based on the UE capabilities) and will convey this information to the Master-eNB. The Master-eNB will then transmit the chosen configurations to the UE, so that the UE in turn can apply them and so be able to work in a dual connectivity mode.

In accordance with the example embodiments of the invention UE capabilities for each RAT contain reference information, and for example reference index(es) or other reference indication(s), such as to other configuration(s) or to an indication of a number of resources consumed, that are used by the other RAT to identify which are the compatible configurations. In accordance with the example embodiments of the invention, information including the reference indexes and reference indications can be derived or obtained by and stored on communication network devices such as the NR 22, NN 23, and/or UE 21 as in FIG. 1. In accordance with the embodiments this information is stored on the NR 22, NN 23, and/or UE 21 or on other devices associated with these device.

In accordance with the example embodiments of the invention a network node, such as the NN 23, NR 22, or UE 21 as in FIG. 1, can indicate or identify a chosen configuration via such reference index(es). In addition, in accordance with the example embodiments the indications identified by the node can include information of properties and/o restrictions of each of the configurations of the index, including the identified and/or chosen configuration(s). Such configuration information can be indicated in the reference indexes and/or reference indications. Further, it is noted that in accordance with the example embodiments the reference index(es) may be known priori or in advance by the network node and stored by the network node in its memory. It is noted that examples of the reference indexes may be seen in FIG. 3 as discussed below.

Further, in accordance with the example embodiments of the invention the same reference index(es) and/or reference indication(s) and/or information associated with the index(es) can include data throughput information, channel quality information, and/or power control status information. Any one or more of these types of information can be used to choose and/or identify suitable configuration(s) for dual connectivity operations. In accordance with the example embodiments, any of these types of information as mentioned herein can be used in conjunction with a threshold to identify and/or chose a configuration for the DC. If a level of operation associated with any of these types of information is above or below the threshold the network node can use this information to identify or choose the configuration(s) that suits the network node(s), such as the NR 22, NN 23, and/or UE 21 as in FIG. 1.

In accordance with the embodiments, when requesting tight interworking a reference is used to identify the master node configuration so that secondary node only has to know which configurations it is allowed to use from within the UE capabilities indicated for tight interworking. Hence, each node only has to comprehend its own RAT capabilities, and the reference indicator is utilized inside those to identify the allowed configurations.

Figure 2:
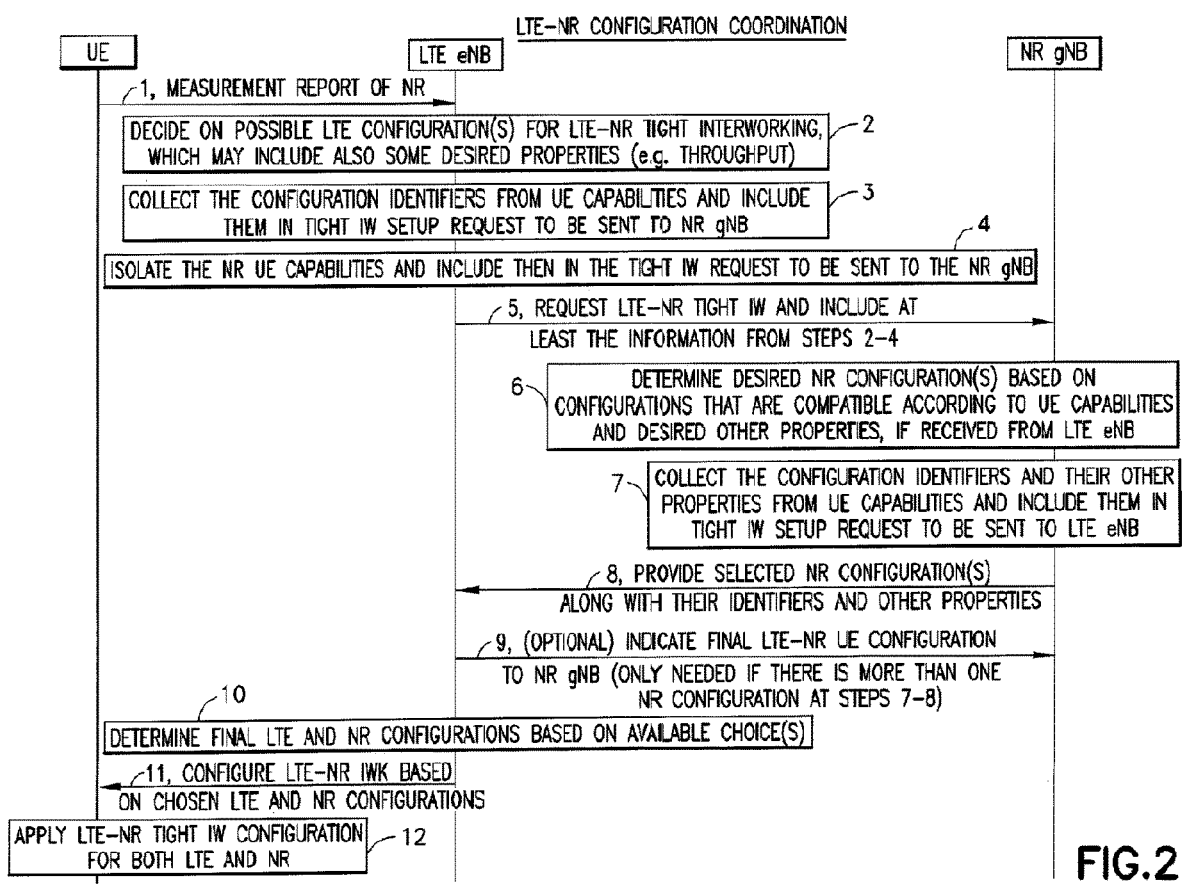
FIG. 2 shows a procedural flow for LTE-NR configuration coordination

FIG. 2 shows a procedural flow for LTE-NR configuration coordination. An example embodiment of the invention can be summarized in steps 3-11 of the following procedural flow (here assuming LTE acting as master and NR acting as secondary, as indicated in parentheses).

In FIG. 2 there is shown the following steps which may be performed by devices such as the UE 21, the NN 23, and/or the NR 22 as shown in FIG. 1. These steps include:

1. UE sends a measurement report of NR cells (based on existing measurement configuration);
2. (LTE) Master node receives the report and decides to request LTE-NR interworking with (NR gNB as) secondary node;
3. (LTE) Master node identifies zero or more desired master node (LTE) configurations based on (LTE) UE capabilities, each of which also includes an indication how to identify the said (LTE) configuration within the secondary access (NR) UE capabilities and may identify properties and constraints of the LTE configuration (e.g., identify expected LTE throughput and/or usage of L1/L2 resources);
4. (LTE) Master node identifies, within the UE capability container(s), the (NR) capabilities, properties and constraints received from the UE to be forwarded to the secondary node as part of the LTE-NR interworking request;
5. Master node requests tight interworking from the secondary node (including UE capability information for the secondary node (NR) RAT received from UE) and may include zero or more indicators identifying the chosen master node (LTE) configuration, its properties and its constraints;
6. Based on the one or more (LTE) configuration reference indications received from (LTE) master node, the (NR) secondary node determines the set of available configurations for the (NR) secondary radio access configuration by using the information within the received (NR) UE capabilities and chooses one or more configuration indices to indicate to (LTE) master node, and may also identify properties and constraints of the NR configuration (e.g., expected NR throughput and/or usage of L1/L2 resources);
7. The (NR) secondary node identifies the configuration identifiers of the one or more chosen radio configurations to be communicated to the (LTE) master node;
8. The (NR) secondary node indicates the one or more chosen (NR) configurations and their reference indications to the master node, and may indicate properties and constraints of each of the reference indications (e.g., expected NR throughput and/or usage of L1/L2 resources);
9. If more than one configuration indication is provided by the (NR) secondary node, the (LTE) master node chooses the (NR) secondary node configuration based on the choices given (NOTE: This step is only entered in case the secondary node provides more than one configuration option; Otherwise this step is skipped) and indicates this to the (NR) secondary node.

10. The (LTE) master node determines the final (LTE) master node configuration based on the chosen NR configuration reference indication and potentially the properties and constraints of the NR configuration as indicated by the NR node;
11. The master node provides the overall radio configuration for the tight interworking for the UE: The radio configuration for the master node RAT comes fully from the master node (as decided in steps 2 and 10), whereas the radio configuration for the secondary node RAT comes fully from the (NR) secondary node (as received by master node in step 8); and
12. The UE applies the (LTE) master and (NR) secondary radio configurations received from the (LTE) master node.

Benefits of this method in accordance with the example embodiments of the invention may be summarized as below:
Each RATs capabilities are independent and neither RAT needs to comprehend the other RATs capabilities;
Each node can decide on its own configuration independently without needing to comprehend the other RAT configuration;
Allows master node to decide (or not to decide) on limitations posed to the secondary node while retaining the final control at master node; and
A similar method can work with the LTE and NR being master.

FIG. 3 shows a Table with examples of ASN.1 code for capturing the configuration linkage information in LTE UE capabilities. FIG. 3 shows an example of how a linkage between LTE and NR configurations is contained in the ASN.1 defined for UE capabilities. ASN.1 is a standard and notation that identifies rules and structures for representing, encoding, transmitting, and decoding data in telecommunications and/or computer networking. The ASN.1 enables representation of objects that are independent of machine-specific encoding techniques. Formal notation makes it possible to automate the task of validating whether a specific instance of data representation abides by the specifications. In accordance with the example embodiments of the invention network devices such as the NR 22, NN 23, and/or UE 21 as in FIG. 1 may create and communicate this type of table with the ASN.1 code defined for the UE 21 or for any other device of a communication network.

As shown in the Table of FIG. 3, each band combination can be tagged with a list of indices 310, 320, and supported band lists 330 that refer to the indices in the EUTRA and NR capabilities. In a similar manner, in accordance with the example embodiments, each LTE band combination 340 can be tagged with an index to indicate how it can be referred to in the NR capabilities. To illustrate this further, FIG. 4 as described below shows a possible example of how the combinations could work by showing the structure and the connections between the LTE and NR capabilities.

Figure 4:
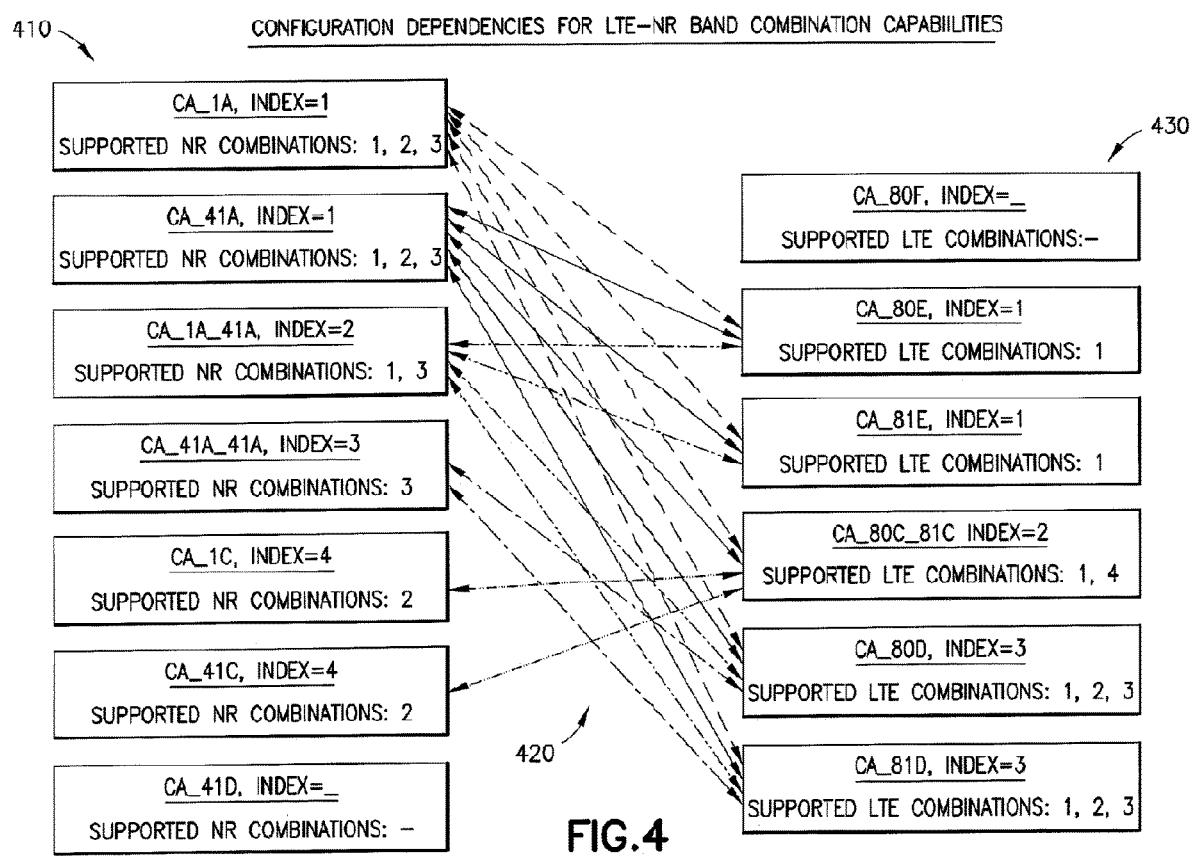
FIG. 4 shows how a linkage between LTE and NR configurations is contained in UE capabilities.

FIG. 4 shows an example of how a linkage 420 between LTE (and/or another RAT) configurations 430 and NR configurations 410 is contained in UE capabilities. The supported LTE and NR combinations are matched for different CAs and indexes. The following combinations as shown in FIG. 4 can be seen to characterize at least the configuration selecting and determining operations in accordance with the example embodiments of the invention:

In one embodiment, the UE (such as the UE 21 of FIG. 1) creates an index for each supported LTE band combination and matches the indices together with the indices for NR band combinations to indicate which band combination combinations are supported;

In one embodiment, an eNB (such as the NN 23 of FIG. 1) determines the desired one or more band combinations, and determines for the LTE-NR tight interworking purposes the allowed list of indices of NR band combinations based on the information given inside the LTE capabilities;

In related embodiment, the eNB indicates the allowed NR band combinations according to a given list of indices (which may refer to also other properties and constraints of the said NR band combinations) and requests NR (such as the NR 22 of FIG. 1) to indicate the suitable one or more NR band combination indices among those.

In related embodiment, upon receiving a list of indices from NR eNB, LTE eNB determines the LTE configuration based on the indices indicated within the LTE UE capabilities;

In one embodiment, determining at eNB (such as the NN 23 of FIG. 1) based on only LTE capabilities, the LTE radio configuration for LTE-NR tight interworking In one embodiment, determining at gNB based on only NR capabilities and indicated list of indices from eNB, the NR radio configuration for LTE-NR tight interworking; and In one embodiment, determining at eNB based on only LTE capabilities and indicated list of indices from gNB, the LTE radio configuration for LTE-NR tight interworking; and Other embodiments may also be considered along the same principles.

Figure 5A:
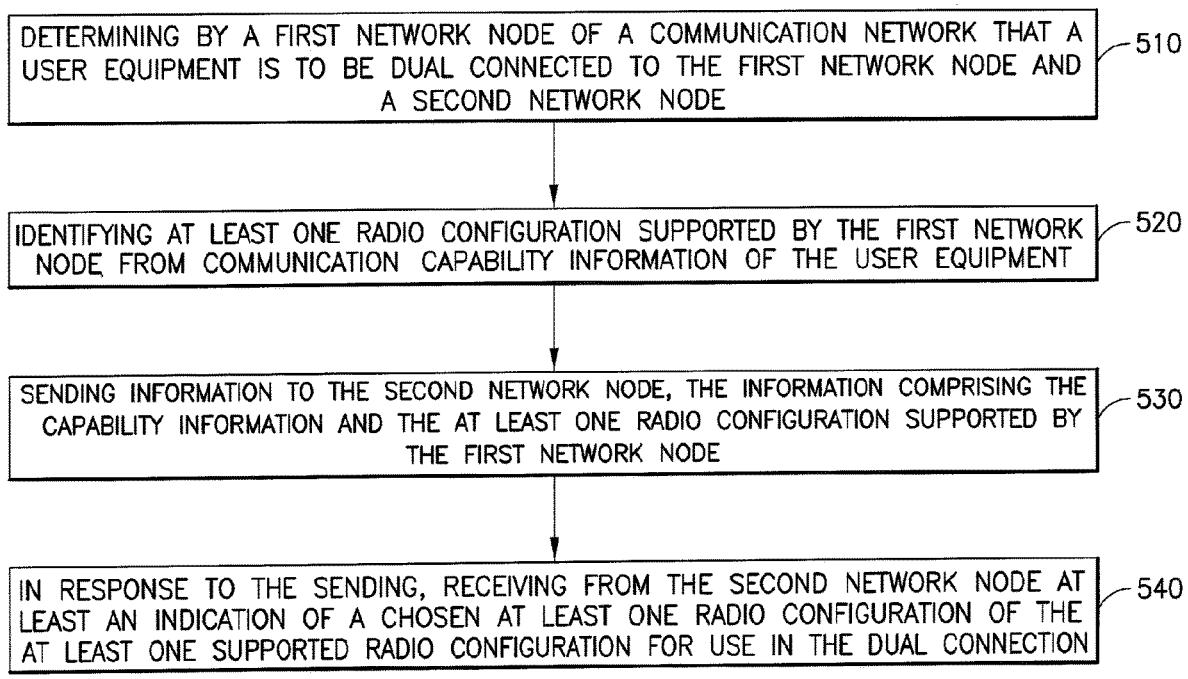
FIGS. 5A, 5B, and 5C each show a method which may be performed by an apparatus in accordance with the example embodiments of the invention.

FIG. 5a illustrates operations which may be performed by a network device such as, but not limited to, a network node such as the NN 23 as in FIG. 1. As shown in step 510 there is determining by a first network node of a communication network, that a user equipment is to be dual connected to the first network node and a second network node. Then as shown in step 520, there is identifying at least one radio configuration supported by the first network node from communication capability information of the user equipment. As shown in step 530, there is sending information to the second network node, the information comprising the capability information and the at least one radio configuration supported by the first network node. Then at step 540, there is in response to the sending, receiving from the second network node an indication of a chosen at least one radio configuration of the at least one supported radio configuration for use in the dual connection.

In accordance with the example embodiments as described in the paragraph above, the first network node comprises a long term evolution base station, and wherein the second network node comprises a next generation radio technology base station.

In accordance with the example embodiments as described in the paragraphs above, the determining that the user equipment is to be dual connected is based on a measurement report from the user equipment.

In accordance with the example embodiments as described in the paragraphs above, the determining that the user equipment is to be dual connected is based on at least one of information explicit of channel or device conditions from the user equipment and information implicit of channel or device conditions from the communication network.

In accordance with the example embodiments as described in the paragraph above, the explicit conditions from the user equipment comprises channel power control status information and the implicit conditions from the communication network comprises quality indicator information.

In accordance with the example embodiments as described in the paragraphs above, where the identifying the at least one radio configuration supported by the first network node is based on throughput expectations of at least one of the first network node and the second network node.

In accordance with the example embodiments as described in the paragraph above, the sent information comprises an indication of identifiers of the at least one supported radio configuration within the capability information.

In accordance with the example embodiments as described in the paragraph above, for a case the chosen at least one radio configuration comprises more than one configuration, the first network node selecting one of the more than one chosen configuration for the dual connection.

In accordance with the example embodiments as described in the paragraph above, the information sent to the second network node comprises a tight interworking request by the first network node.

In accordance with the example embodiments as described in the paragraph above, there is configuring the tight internetworking based on the chosen at least one radio configuration; and sending to the user equipment the chosen at least one radio configuration for use with dual connectivity configuration of the user equipment to the first network node and a second network node.

In accordance with an example embodiment of the invention as described above there is an apparatus comprising: means for determining by a first network node of a communication network, (RX 23E, DP 23A, PROG 23C, MEM 23B as in FIG. 1) that a user equipment is to be dual connected to the first network node and a second network node. Then as shown in step 520 there is means for identifying (CFG 23G, DP 23A, PROG 23C, MEM 23B as in FIG. 1) at least one radio configuration supported by the first network node from communication capability information of the user equipment. As shown in step 530 there is means for sending information (TX 23D, DP 23A, PROG 23C, MEM 23B) as in FIG. 1 to the second network node, the information comprising the capability information and the at least one radio configuration supported by the first network node. Then at step 540 there is means, in response to the sending, for receiving (RX 23E, DP 23A, PROG 23C, MEM 23B as in FIG. 1) from the second network node an indication of a chosen at least one radio configuration of the at least one supported radio configuration for use in the dual connection.

In the example aspect of the invention according to the paragraph above, wherein at least the means for determining, identifying, receiving, and sending comprises a computer readable medium [MEM 23B] encoded with a computer program [PROG 23C] executable by at least one processor [DP 23A and/or CFG 23G] as shown in FIG. 1.

Figure 5B:
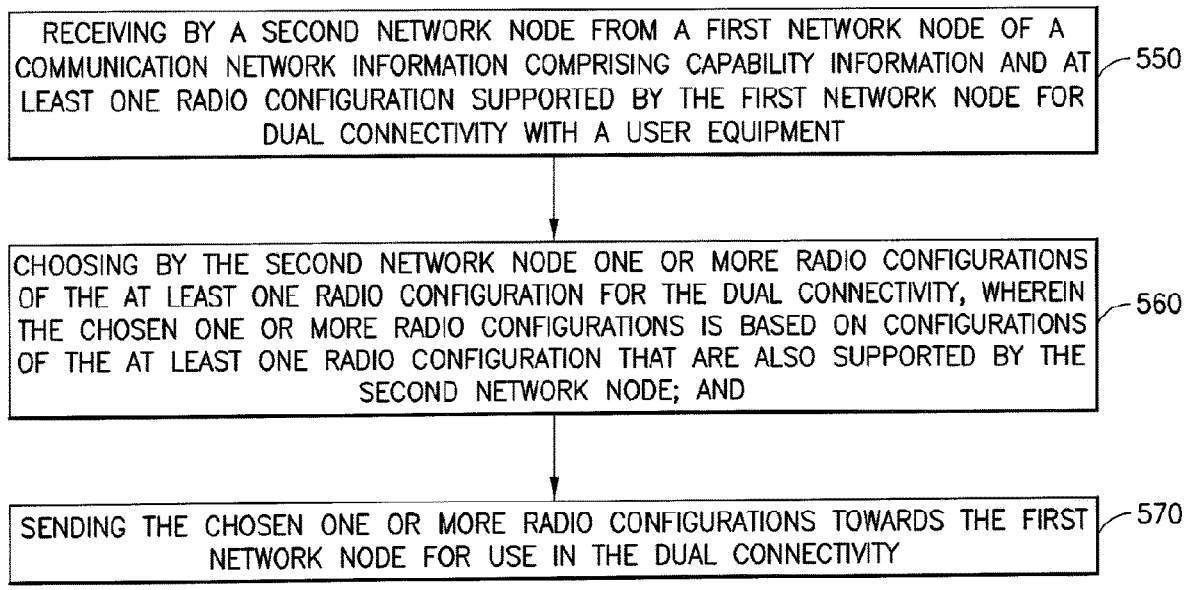

FIG. 5b illustrates operations which may be performed by a network device such as, but not limited to, a new radio network node such as the NR 22 as in FIG. 1. As shown in step 550 there is receiving by a second network node from a first network node of a communication network information comprising capability information and at least one radio configuration supported by the first network node for dual connectivity with a user equipment. Then as shown in step 560 there is choosing by the second network node one or more radio configurations of the at least one radio configuration for the dual connectivity, wherein the chosen one or more radio configurations is based on configurations of the at least one radio configuration that are also supported by the second network node. Then at step 570 there is sending the chosen one or more radio configurations towards the first network node for use in the dual connectivity.

In accordance with the example embodiments as described in the paragraph above, the information from the first network node comprises a tight interworking request by the first network node.

In accordance with the example embodiments as described in the paragraphs above, the information from the first network node comprises an indication of identifiers of the supported at least one radio configuration within the capability information, wherein the choosing is based on the identifiers.

In accordance with the example embodiments as described in the paragraphs above, the first network node comprises a long term evolution base station, and wherein the second network node comprises a next generation radio technology base station.

In accordance with an example embodiment of the invention as described above there is an apparatus comprising: means for receiving (RX 22E, DP 22A, PROG 22C, MEM 22B as in FIG. 1) by a second network node from a first network node of a communication network information comprising capability information and at least one radio configuration supported by the first network node for dual connectivity with a user equipment. Then as shown in step 560 there is means for choosing (TX 22D, DP 22A, CFG 22G, PROG 22C, MEM 22B) by the second network node one or more radio configurations of the at least one radio configuration for the dual connectivity, wherein the chosen one or more radio configurations is based on configurations of the at least one radio configuration that are also supported by the second network node. Then at step 570 there is means for sending (TX 22E, DP 22A, PROG 22C, MEM 22B as in FIG. 1) the chosen one or more radio configurations towards the first network node for use in the dual connectivity.

In the example aspect of the invention according to the paragraph above, wherein at least the means for choosing, receiving, and sending comprises a computer readable medium [MEM 22B] encoded with a computer program [PROG 22C] executable by at least one processor [DP 22A and/or CFG 22G] as shown in FIG. 1.

Figure 5C:
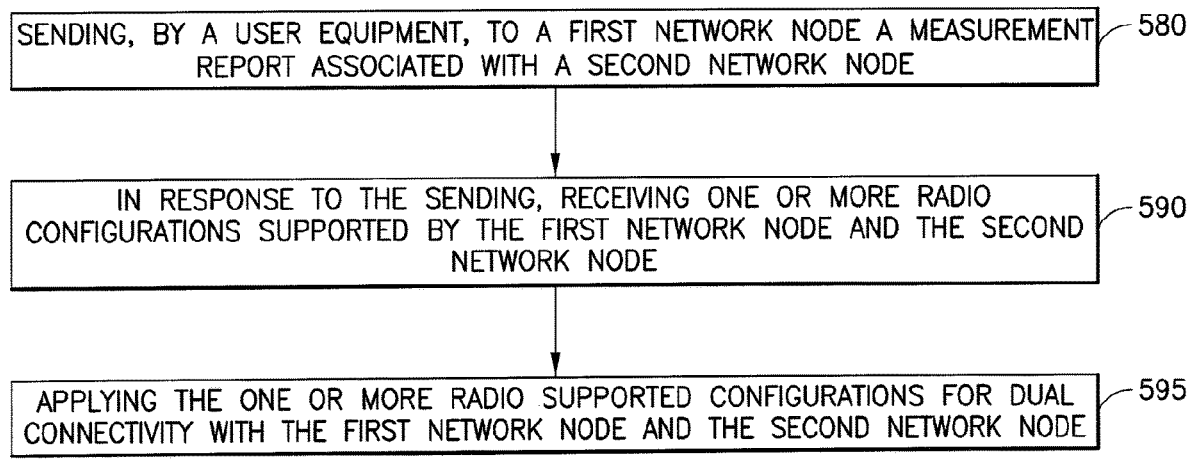

FIG. 5c illustrates operations which may be performed by a network device such as, but not limited to, a remote node such as the UE 21 as in FIG. 1. As shown in step 580 there is sending, by a user equipment, to a first network node a measurement report associated with a second network node. Then as shown in step 590 there is in response to the sending, receiving one or more radio configurations supported by the first network node and the second network node. Then at step 595 there is applying the one or more radio supported configurations for dual connectivity with the first network node and the second network node.

In accordance with the example embodiments as described in the paragraphs above, the first network node comprises a long term evolution base station, and wherein the second network node comprises a next generation radio technology base station.

In accordance with an example embodiment of the invention as described above there is an apparatus comprising: means for sending (TX 21D, DP 21A, PROG 21C, MEM 21B as in FIG. 1), by a user equipment, to a first network node a measurement report associated with a second network node. Then as shown in step 590 there is means in response to the sending, for receiving (RX 21E, DP 21A, PROG 21C, MEM 21B as in FIG. 1) one or more radio configurations supported by the first network node and the second network node. Then at step 595 there is means for applying (RX 21E, DP 21A, PROG 21C, MEM 21B as in FIG. 1) the one or more radio supported configurations for dual connectivity with the first network node and the second network node.

In the example aspect of the invention according to the paragraph above, wherein at least the means for choosing, receiving, and sending comprises a computer readable medium [MEM 21B] encoded with a computer program [PROG 21C] executable by at least one processor [DP 21A and/or CFG 21G] as shown in FIG. 1.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

The invention claimed is:

1. An apparatus comprising:
   at least one processor; and
   at least one memory including computer program code, where the at least one memory and the computer program code are configured, with the at least one processor, to cause the apparatus to at least:
   determine with a first network node of a user equipment of a communication network that a user equipment is to be dual connected to the first network node and to a second network node;
   identify at least one supported radio configuration supported by the first network node from communication capability information of the user equipment;
   send information to the second network node, the information comprising the capability information of the user equipment and the at least one supported radio configuration supported by the first network node and at least one reference index comprising an indication of identifiers of at least one of data throughput information, channel quality information, or power control status information for choosing the at least one supported radio configuration,
   wherein the capability information comprises an allowed list of indices of identified configuration combinations of the at least one reference index associated with long term evolution capabilities for the first network node and the second network node, and
   wherein each of the identified configuration combinations is tagged with a supported at least one of a long term evolution or new radio band to indicate how each of the identified configuration combinations can be referenced by at least one of the first network node or the second network node for a dual connection; and
   based on the information, receive from the second network node an indication of a chosen at least one radio configuration of the at least one supported radio configuration for use in establishing a dual connection to the user equipment with the first network node and the second network node.

2. The apparatus of claim 1, wherein the first network node comprises a long term evolution base station, and wherein the second network node comprises a next generation radio technology base station.

3. The apparatus of claim 1, wherein the determining that the user equipment is to be dual connected is based on a measurement report from the user equipment.

4. The apparatus of claim 1, wherein the identifying is based on at least one of channel power control status information, quality indicator information and throughput expectations of at least one of the first network node, the second network node, and the user equipment.

5. The apparatus of claim 1, wherein the capability information is indicating a new radio communication capability of the user equipment.

6. The apparatus of claim 1, wherein the information comprises identified properties and constraints associated with the indication of identifiers, wherein the identified properties and constraints are based on a required at least one of a throughput or resource capability for the chosen at least one radio configuration.

7. The apparatus of claim 1, wherein identifying the capability information is based on one of capability information predetermined by the apparatus or received from the communication network.

8. An apparatus, comprising:
at least one processor; and
at least one memory including computer program code, where the at least one memory and the computer program code are configured, with the at least one processor, to cause the apparatus to at least;
receive with a second network node from a first network node of a user equipment of a communication network information comprising capability information of a user equipment and at least one supported radio configuration supported by the first network node for dual connectivity with a user equipment that is dual connected to the first network and to the second network and at least one reference index comprising an indication of identifiers of at least one of data throughput information, channel quality information, or power control status information for choosing the least one supported radio configuration;
choose by the second network node at least one of the identifiers from the at least one reference index indicating one or more radio configurations of the at least one radio configuration for the dual connectivity, wherein the chosen one or more radio configurations is based on configurations of the at least one radio configuration that are also supported by the second network node;
wherein the capability information comprises an allowed list of indices of identified configuration combinations of the at least one reference index associated with long term evolution capabilities for the first network node and the second network node, and
wherein each of the identified configuration combinations is tagged with a supported at least one of a long term evolution or new radio band to indicate how each of the identified configuration combinations can be referenced by at least one of the first network node or the second network node for a dual connection; and
send the chosen one or more radio configurations towards the first network node for use in establishing the dual connectivity to the user equipment with the first network node and the second network node.

9. The apparatus of claim 8, wherein the information from the first network node comprises a tight interworking request by the first network node.

10. The apparatus of claim 8, wherein the capability information is indicating a new radio communication capability of the user equipment.

11. The apparatus of claim 8, wherein the first network node comprises a long term evolution base station, and wherein the second network node comprises a next generation radio technology base station.

12. A method comprising:
determining by a first network node of a user equipment that a user equipment of a communication network is to be dual connected to the first network node and to a second network node;
identifying at least one radio configuration supported by the first network node from communication capability information of the user equipment;
sending information to the second network node, the information comprising the capability information of the user equipment and the at least one radio configuration supported by the first network node and at least one reference index comprising an indication of identifiers of at least one of data throughput information, channel quality information, or power control status information for choosing the at least one supported radio configuration;
wherein the capability information comprises an allowed list of indices of identified configuration combinations of the at least one reference index associated with long term evolution capabilities for the first network node and the second network node, and
wherein each of the identified configuration combinations is tagged with a supported at least one of a long term evolution or new radio band to indicate how each of the identified configuration combinations can be referenced by at least one of the first network node or the second network node for a dual connection; and
based on the information, receiving from the second network node an indication of a chosen at least one radio configuration of the at least one supported radio configuration for use in establishing the dual connection to the user equipment with the first network node and the second network node.

13. The method of claim 12, wherein the first network node comprises a long term evolution base station, and wherein the second network node comprises a next generation radio technology base station.

14. The method of claim 12, wherein the determining that the user equipment is to be dual connected is based on a measurement report from the user equipment.

15. The method of claim 12, wherein the identifying is based on at least one of channel power control status information, quality indicator information and throughput expectations of at least one of the first network node, the second network node, and the user equipment.

16. The method of claim 12, wherein the capability information is indicating a new radio communication capability of the user equipment.

* * * * *